United States Patent
Wells

(10) Patent No.: US 7,302,160 B1
(45) Date of Patent: Nov. 27, 2007

(54) AUDIO/VIDEO RECORDER WITH AUTOMATIC COMMERCIAL ADVANCEMENT PREVENTION

(75) Inventor: Aaron G. Wells, Piedmont, CA (US)

(73) Assignee: LSI Corporation, Milpitas, CA (US)

( * ) Notice: Subject to any disclaimer, the term of this patent is extended or adjusted under 35 U.S.C. 154(b) by 1196 days.

(21) Appl. No.: 10/054,286

(22) Filed: Jan. 22, 2002

(51) Int. Cl.
*H04N 5/91* (2006.01)

(52) U.S. Cl. .............. 386/94; 386/46; 725/88

(58) Field of Classification Search .......... 386/94, 386/46; 725/88
See application file for complete search history.

(56) References Cited

U.S. PATENT DOCUMENTS

| | | | |
|---|---|---|---|
| 6,002,831 A * | 12/1999 | Tada et al. .............. | 386/46 |
| 6,100,941 A * | 8/2000 | Dimitrova et al. ........ | 348/700 |
| 6,788,882 B1 * | 9/2004 | Geer et al. ............... | 386/116 |
| 7,055,166 B1 * | 5/2006 | Logan et al. ............. | 725/32 |
| 2002/0065678 A1 * | 5/2002 | Peliotis et al. ........... | 705/1 |
| 2003/0123841 A1 * | 7/2003 | Jeannin .................... | 386/46 |

* cited by examiner

*Primary Examiner*—Thai Q. Tran
*Assistant Examiner*—Girumsew Wendmagegn
(74) *Attorney, Agent, or Firm*—Christopher P. Maiorana, P.C.

(57) ABSTRACT

A method for automatically advancing an audio/video signal past undesirable material comprising the steps of (A) detecting possible triggering events during encoding of said audio/video signal, (B) generating one or more scores of various levels in response to said triggering events and (C) advancing past said undesirable material during playback in response to one of said scores.

20 Claims, 3 Drawing Sheets

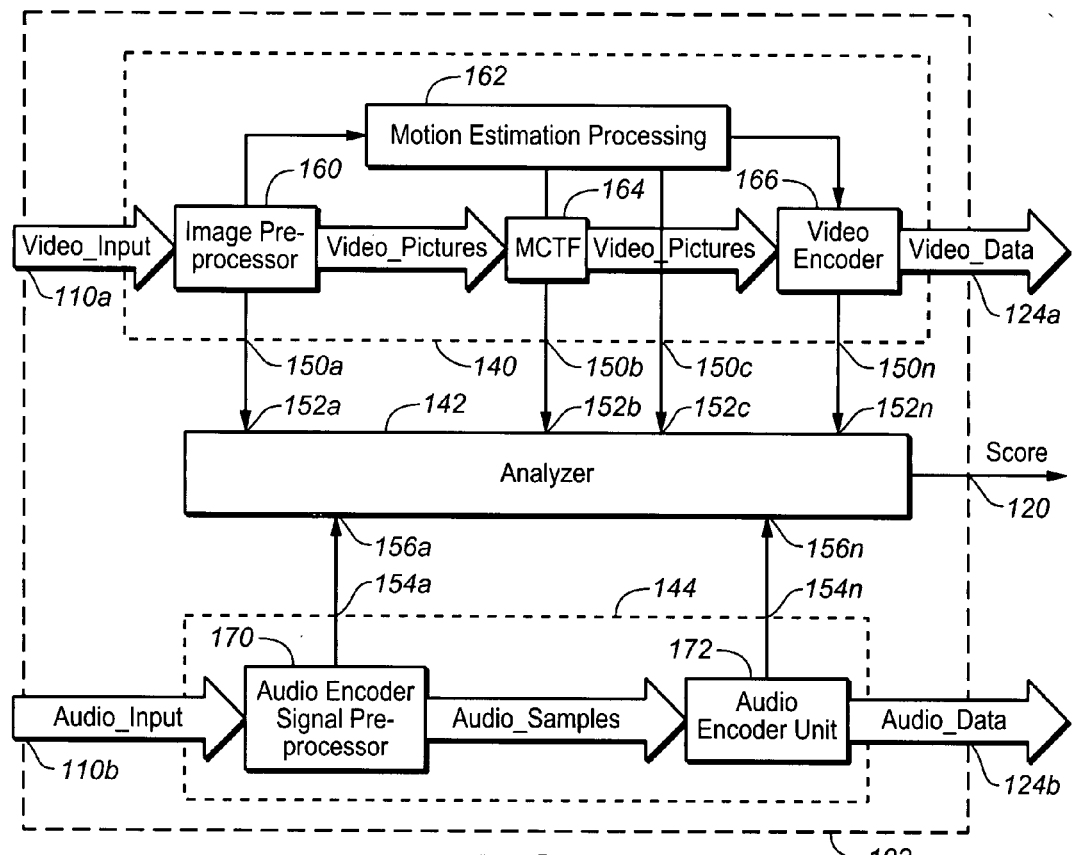
FIG. 3
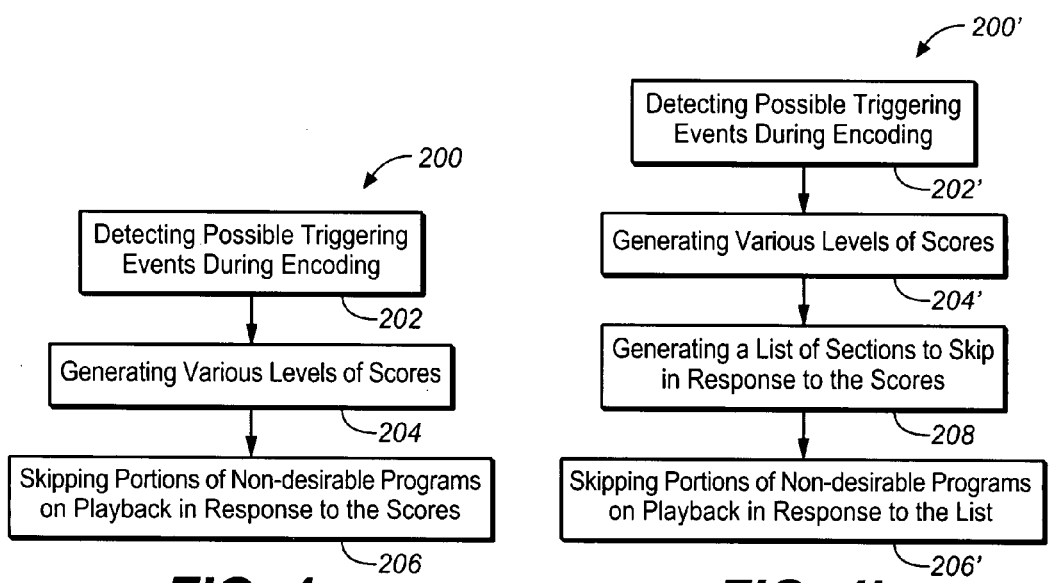
FIG. 4a  FIG. 4b

AUDIO/VIDEO RECORDER WITH AUTOMATIC COMMERCIAL ADVANCEMENT PREVENTION

FIELD OF THE INVENTION

The present invention relates to a method and/or architecture for implementing an audio/video recorder generally and, more particularly, to a method and/or architecture for implementing an audio/video recorder with automatic commercial advancement detection and/or skip features.

BACKGROUND OF THE INVENTION

Conventional video recording systems are typically tape-based (i.e., video cassette recorders (VCRs) using VHS tape). Such systems do not compress audio and video or provide random access storage. Conventional video recording systems also do not provide content analysis. The lack of random access prevents the systems from accessing a playlist generated from post processed statistics. In particular, since the playlist has to be known ahead of time for playback but can only be recorded after the commercial has been recorded to the media.

Some conventional VCRs provide commercial skip features. However, such systems need a second pass to go through the tape and mark the detected commercials. Conventional VCRs operate in the analog domain and use only audio mute and black frames to detect commercials. Therefore, commercial skip on tape is not a seamless experience for the user. In particular, the tape is accelerated through the commercial then decelerated and brought back to smooth, stable realtime playback with proper tension at the end of the advertisement.

Even if there were and alternate storage device in a tape-based system (e.g., the playlist were stored to flash), the mechanics of accelerating the tape through the commercial, tracking timing during the fast forward, decelerating and recovering video synchronization smoothly renders the feature considerably more expensive and less useful than disk-based systems.

Users find the commercial skip feature of HDD recorders (also known as DVRs, PVRs or time-shifters) to be a compelling feature. Typical half-hour television programs contain 6 to 8 minutes of commercials, so the user can watch a one hour program in 44 to 48 minutes if it is originally recorded to a HDD. Identifying and skipping a commercial, however, requires user intervention, which is undesirable. Moreover, the user must watch enough of the commercial to recognize it as an advertisement and not a return to the desired programming.

In order for a user to skip commercials in a digital recording system, the user must view, detect and provide (e.g., via the remote control) input to the system to prompt scene removal. Such a configuration uses additional time, disks space and activity on part of the user. Some conventional recording systems use a manual 27 second commercial skip. However, this is also an approximate, fixed distance rather than the proper duration of the advertisement. Other conventional automatic commercial skip features (e.g., Replay TVs/SonicBlue) have the disadvantage of (a) using only video statistics and/or (b) being built from discrete systems of audio encoders, video encoders and/or separate processors.

It would be desirable to provide an audio/video recorder with automatic commercial advancement detection and/or skip features that may (i) use both audio and video characteristics, (ii) be integrated as a system without adding computational complexity, cost, latency, or memory and (iii) be more accurate than conventional approaches by using encoding statistics (e.g., DC motion characteristics, etc.).

SUMMARY OF THE INVENTION

One aspect of the present invention concerns a method for automatically advancing an audio/video signal past undesirable material comprising the steps of (A) detecting possible triggering events during encoding of said audio/video signal, (B) generating one or more scores of various levels in response to the triggering events and (C) advancing past the undesirable material during playback in response to one of the scores.

Another aspect of the present invention concerns an apparatus comprising a detector circuit and a data storage device. The detector circuit may be configured to generate (i) an audio/video data signal and (ii) one or more score signals of various levels in response to an input signal. The data storage device may be configured to (i) store the audio/video data signal and (ii) generate an output signal in response to (a) the stored audio/video signal and (b) one of the score signals.

The objects, features and advantages of the present invention include providing a method and/or architecture for recording television signals that may (i) detect commercials based on post processed statistics, (ii) record the entire program, including commercials to allow skip back to view falsely identified and skipped material, (iii) be implemented without additional cost since HDD recorders incorporate video and/or audio encoders, (iv) provide aggressive settings for commercial skip enable, and/or (v) allow more programming time on the HDD by deleting the commercial from the storage with a copy operation.

BRIEF DESCRIPTION OF THE DRAWINGS

These and other objects, features and advantages of the present invention will be apparent from the following detailed description and the appended claims and drawings in which:

FIG. 3 is a more detailed block diagram of the detection circuit of FIGS. 1 and 2;

FIGS. 4(*a-b*) are flow diagrams illustrating an operation of the present invention.

DETAILED DESCRIPTION OF THE PREFERRED EMBODIMENTS

Figure 1:
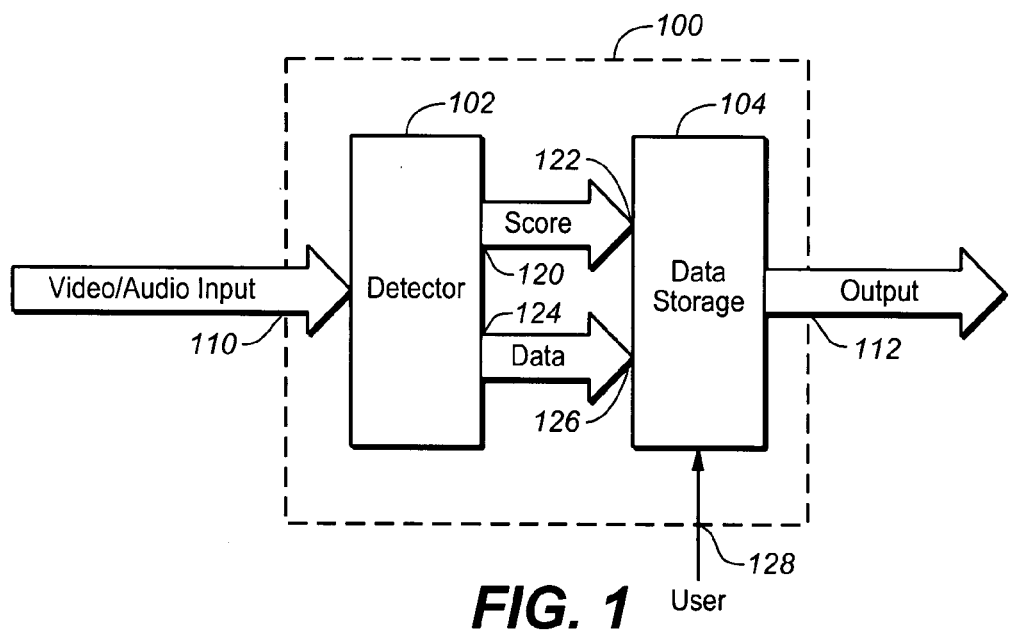
FIG. 1 is a block diagram of a preferred embodiment of the present invention.

Referring to FIG. 1, a block diagram of a system 100 is shown in accordance with a preferred embodiment of the present invention. The system 100 generally comprises a detector 102 and a data storage block (or circuit) 104. The system 100 may have an input 110 that may receive a signal (e.g., AUDIO/VIDEO_INPUT) and an output 112 that may present a signal (e.g., OUTPUT). The signal AUDIO/VIDEO_INPUT may be a decoded or undecoded signal such as a signal received from an over the air (OTA) antenna, a cable signal, a satellite signal, etc. The signal OUT may be presented to a video monitor. The detector circuit 102 may have an output 120 that may present a signal (e.g., DATA) to an input 122 of the data storage circuit 104. The detector circuit 124 may also have an output 124 that may present one or more signals (e.g., SCORE) to an input 126 of the data storage circuit 104. The data storage circuit 104 may also have an input 128 that may receive a signal (e.g., USER).

Figure 2:
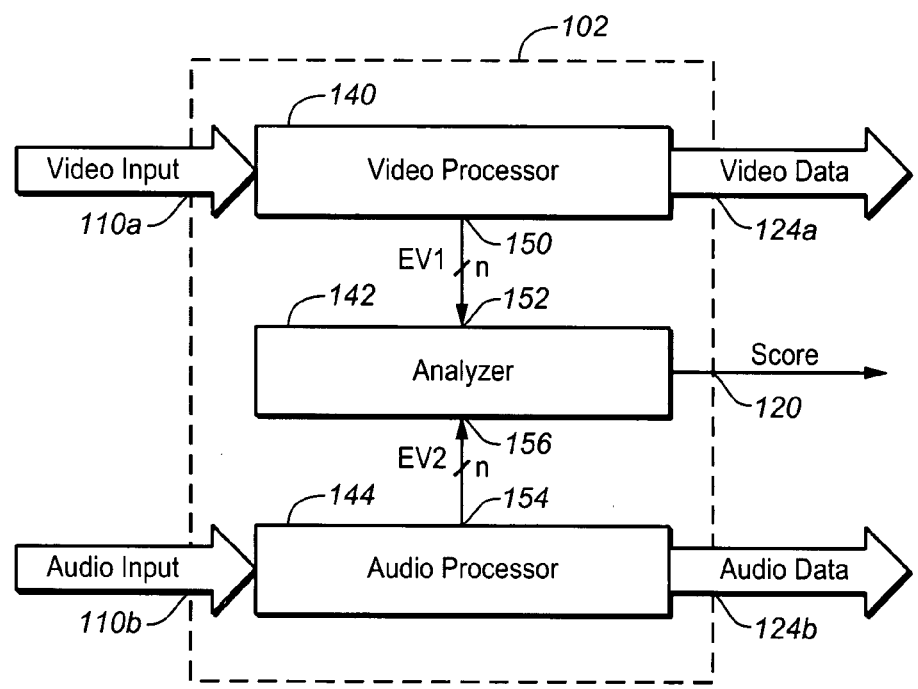
FIG. 2 is a detailed block diagram of the detection circuit of FIG. 1.

Referring to FIG. 2, a detailed block diagram of the detector 102 is shown. The detector 102 generally comprises a block (or circuit) 140 a block (or circuit) 142 and a block (or circuit) 144. The circuit 140 may be implemented as a video processor circuit. The circuit 142 may be implemented as an analyzer circuit. The circuit 144 may be implemented as an audio processor circuit. The video processor 140 may have an output 150 that may present a number of event signals (e.g., EV1) to an input 152 of the analyzer 142. The audio processor 144 may have an output 154 that may present a number of event signals (e.g., EV2) to an input 156 of the analyzer 142.

The signals SCORE may be generated for each time period relating to the likelihood that the proceeding period was a commercial. Various levels of aggressiveness may be generated for the signals SCORE (to be described in connection with FIGS. 4a and 4b). The circuit 100 may then be configured to take action in response to one of the signals SCORE. Such actions may include generating a list of undesirable sections (e.g., commercials) to skip over and entry points to jump to during playback of the program. The circuit 100 may be implemented as an audio/video recorder with automatic commercial advancement detection and/or skip features.

Additionally, the present invention may be used to operate in a semi-automatic commercial skip mode. For example, a user could trigger a skip of an entire block of commercials manually. Such a semi-automatic mode has the benefit of having the best possible detector of all, the viewer. When the viewer triggers the detection of the start of the first commercial, the system can identify the end of that commercial and block of commercials from the saved statistics during playback. A viewer is generally far more accurate than any other system at detecting commercial start. The system 100 could detect commercial end given a 100% confidence in commercial start.

A typical signal SCORE may be the sum of the absolute differences between a block in the target picture and one in the reference picture. For example, if the block size is 16×16 (256 samples total) and the signal SCORE is the minimum of the scores found by comparing characteristics of the target block to all the candidate blocks in the same neighborhood in the reference picture. Typical characteristics may include, but are not limited to (i) noise characteristics (e.g., as detected and eliminated by the MCTF (to be described in connection with FIG. 3)), (ii) change in DC characteristics (e.g., a fade is a near-constant change in illumination which may be manifested as a near linear change in DC value), (iii) spatial activity and change in spatial activity from frame to frame, and/or (iv) text detection (e.g., commercials have more text overlays, sitcoms, soap operas and movies have significantly less).

The data storage circuit 104 may be implemented as a hard disk (or optical disk) recorder. The system 100 may use statistics from the audio and video content to recognize advertisement sequences within a broadcast television program during the encode and record processes. The system 100 may then generate a playlist via the signals SCORE which is used during the playback process to automatically skip forward past the advertisements and play only the program. The commercial skip feature may be a user selectable feature that may be turned on or off. Current video record devices require the user to visually recognize commercials and provide input (via the remote control) to prompt the system to skip the commercial.

Referring to FIG. 3, a block diagram shows an example of an A/V encoder/detector system 102 with an audio and video compression system. The video processor 140 generally comprises a circuit 160, a block (or circuit) 162, a block (or circuit) 164 and a block (or circuit) 166. The circuit 160 may be implemented as an image preprocessor circuit. The circuit 162 may be implemented as a motion estimation processing circuit. The circuit 164 may be implemented as a motion compensated temporal filtering (MCTF) circuit. The circuit 166 may be implemented as a video encoder circuit. The signal VIDEO_INPUT passes through the image preprocessor 160, the MCTF and gets encoded by the video encoder 166. The image preprocessor sends an event signal to the analyzer 142. The image preprocessor 160 also presents a signal to the motion estimation processing circuit 162. The motion estimation processing circuit 162 presents an event signal to the MCTF 164. The MCTF 164 presents an event signal to the analyzer 142. The motion estimation processing circuit also sends an event signal to the input 152c of the analyzer circuit 142. The video encoder 166 presents the signal VIDEO_DATA as well as an event signal to the input 152n of the analyzer 142. The image preprocessor 160, the motion estimation processing circuit 162, the MCTF 164 and the video encoder 166 present the event signals to the analyzer 142 in addition to the processing done to convert the signal VIDEO_INPUT to a signal VIDEO_DATA that can be recorded by the data storage device 104. Since such processing is done to record a digital signal, there is a little additional overhead in creating the signals presented to the analyzer circuit 132.

The audio processor circuit 144 generally comprises a circuit 170 and a circuit 172. The circuit 170 may be implemented as an audio encoder signal preprocessor. The circuit 172 may be implemented as an audio encoder unit. The audio encoder signal preprocessor presents audio samples to the audio encoder unit 172 as well presenting an event signal to the input 156a of the analyzer circuit 142. The audio encoder unit presents the signal AUDIO_DATA that may be recorded by the data storage circuit 104. The audio encoder unit also presents an event signal to the input 156n of the analyzer circuit 142.

Video is captured and analyzed by the image pre-processing unit 160 that may perform spatial and temporal analysis on the video input signal VIDEO_INPUT where a field or frame are captured. The analysis generally includes repeat field detection (e.g., film mode or 3:2 pulldown), localized and global spatial activity, DC (average value) calculations, and the generation of decimated images for hierarchical motion estimation for both compression and for motion compensated temporal filtering (MCTF). The MCTF 164 may generate additional statistics relating to the noise characteristics before and after filtering for use in identification of clips which have undergone different paths in the authoring and video distribution process. For example, advertisements might be played out of servers at a local head-end while the program content may come from a satellite network feed. The video encoder 160 may encode the signal VIDEO_PICTURES as well as provide further statistics on bit usage, fade, scene change, and video content. The motion estimation processing circuit 162 may provide block matching to generate motion vectors candidates to both the MCTF 164 and the video encoder 166.

The audio pre-processor 170 may generate statistics on volume, fades and dynamic range. The audio encoder 172 may generate statistics derived from the audio compression scheme used. For example, the audio encoder may generate data on the energy content of various sub-bands.

Commercial advertisements can be distinguished from the programming into which they are inserted by several factors. Among other statistics, advertisements can be identified by a heuristic combination of (i) time of day (clustered on half-hour boundaries), (ii) duration (typically 15 or 30 seconds), (iii) black video frames before and/or after the advertisement, (iv) muted audio before and after the advertisement, (v) disturbance in the 3:2 pulldown sequence (e.g., the commercial may have been shot as film or video and inserted into a film or into a video program), (vi) scene changes, (vii) motion characteristics, (viii) increases in audio volume, color saturation, and brightness levels, (ix) text overlays, (x) being sequenced with other commercials (e.g., often several commercials are run in sequence), (xi) CC present/absent, SAP present/absent, (xii) copy protection (e.g., CGMS, macrovision) changes, (xiii) aspect ratio changes, (xiv) letterbox to full screen content changes, and/or (xv) noise characteristic changes.

The analyzer 142 takes in these statistics and looks across time to identify program content and advertisement sections of the video. A score is generated for each time period relating to the likelihood that the preceding period was a commercial. A system incorporating such a commercial identifier could then take various actions based on that score, including but not limited to generating a list of sections (likely commercials) to skip over during the playback of the program.

One embodiment of the present invention may evaluate all of the above features, identify sequences of approximately the expected duration, and assign scores to each commercial feature. The overall confidence of a particular sequence being an advertisement could be a function of the individual scores and channel characteristics. This function could be implemented as a simple weighted linear combination of those scores or as a more complex function. For instance, black frames before and after is a very strong indicator, and black frame with audio mute gives much higher confidence than the simple sum of black frames and audio mute. Furthermore, different channels in a cable service, for instance, may have different network feeds and different noise levels present. The system 100 can adapt to such levels and detect commercials using different thresholds on different channels. Furthermore, the system 100 may be used to eliminate such noise and allow playback at substantially the same levels on all channels due to the noise reduction achieved with such processing.

Referring to FIGS. 4a and 4b, various flow diagrams of the present invention are shown. In FIG. 4a, the method 200 generally comprises a step 202, a step 204 and a step 206. The step 202 generally comprises detecting one or more possible triggering events during encoding. The step 204 includes generating various levels of scores in response to the triggering events. The step 206 generally comprises skipping portions of non-desirable programming and playback in response to the scores. The method 200' further includes the step 208 of generating a list of sections to skip in response to the scores.

Figure 5A:
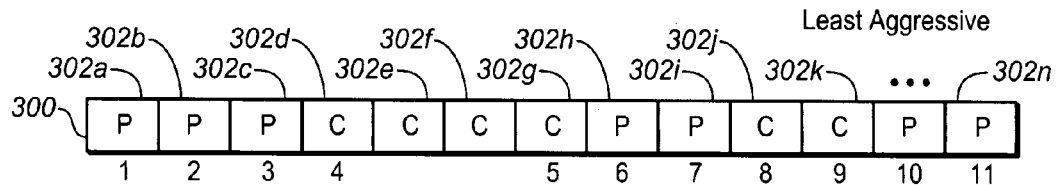
FIGS. 5 (*a-d*) are diagrams illustrating an exemplary implementation of the present invention.

Referring to FIGS. 5a-5d, a conceptual diagram of playback of the signal OUTPUT is shown. The signal OUTPUT is shown represented as the data streams 300, 300', 300' and 300'". The data streams 300-300'" are shown comprising a number of data blocks 302a-302n. Each block 302a-302n generally represents a section of the recorded audio/video signal. The blocks 302a-302n may be bits, bytes, or other appropriate block sizes. Each of the blocks 302a-302n is marked either with a P or a C, indicating whether the actual content of the data stream is a program (P) or a communication (C). The numbers below the blocks 302a-302n show the actual playback sequence of the data. For example, the sequence in FIG. 5a represents playing the blocks 302a-302d, then skipping to block 302g then continuing to block 302n. The blocks 302d and the blocks 302g, while shown as commercials, are still played back. Such playback generally ensures that the beginning or tail end of a particular commercial does not overlap the actual playback material. The commercials in block 302j and 302k may be played back since there is a low confidence that the blocks are actually commercials. With the playback shown in FIG. 5a, a low tolerance for skipping desired material is illustrated.

Figure 5B:
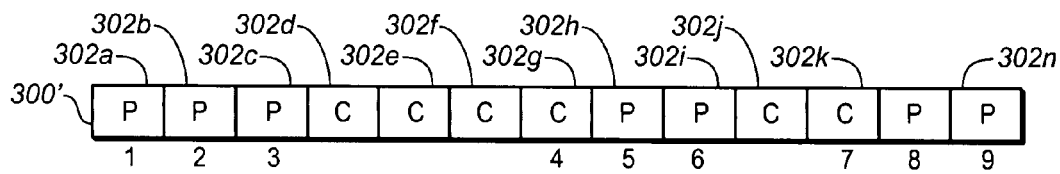

In the playback of the bitstream shown in FIG. 5b, a more aggressive approach is shown. The blocks 302d and 302j are shown as a block that are not played back. However, the blocks 302g and the blocks 302k, while shown as actual commercials, are still played back. Such a playback provides a balance between ensuring all of the desired materials played and all of the commercial material skipped. However, the chances of actually skipping actual playback material may increase as aggressiveness increases.

Figure 5C:
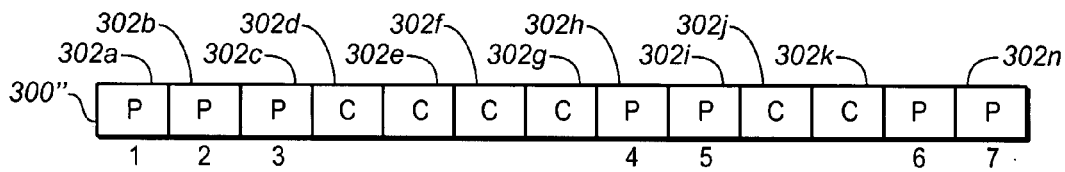
Figure 5D:
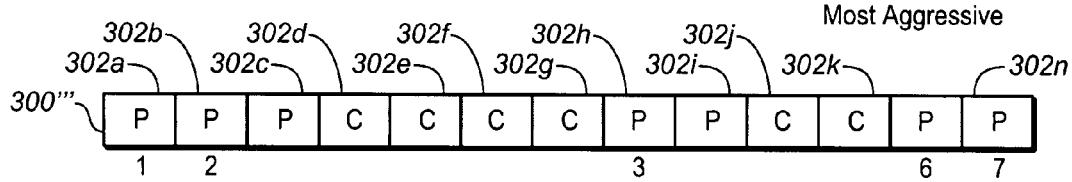

Referring to FIG. 5c, a very aggressive skip sequence is shown. None of the actual commercials are played and all of the program material is played. This is the most desirable playback approach. However, if the approach in determining commercials is to aggressive, some desired playback material may be skipped. FIG. 5d shows a playback approach that is to aggressive. The blocks 502c and the blocks 502i, while actual program material, are skipped by the playback sequence.

The desired and undesired program material is not limited to commercial and non-commercial programming. For example, a playback list may be generated in response to undesired material that may be part of the actual programming. Such an approach may be desirable in watching recorded sports events. For example, when watching a recorded football game, the actual action is quite a small portion of the total time ever without commercials. One playback approach may be to have the present invention skip to the actual live portions of the event. The event signals may be the view of the football field shown from the camera at the 50 yard line and in wide angle. This view is often shown uninterrupted until the end of the play followed by a number of instant replays shown from various angles. These instant replays could be skipped, moving the video playback to the next play in the game. Such an approach would allow a football game to be watched in a fraction of the actual time needed to record the game. Since all of the underlying material would still be recorded, the instant replays and commentary of a particularly interesting play could still be viewed in response to user input. Such playback could be particularly interesting to professional athletes to quickly find the important sections of a number of games.

The process of encoding (compressing) the audio and video incorporates various pixel, frame, and sequence evaluations which may be used to identify commercials with little, if any, additional cost or computation. For instance, black frames, scene changes, brightness (DC value), spatial activity (text detection), repeat field detection (3:2 pulldown cadence) and motion estimation are all done in a typical MPEG video encoder. Similarly, the various audio encoders will detect muting, silence, volume, and other salient audio features as a part of a typical audio encoder.

The commercial detection of the present invention is based on post processing statistics. This is far more accurate than basing it on preprocessing statistics, since the present invention can evaluate duration, sequences, and the other identifying features at both the entry to and exit from the commercials. The present invention is more accurate than conventional approach since it can look across an arbitrarily long sequence before and after in our detector. The entire program, including commercials is normally recorded to the data storage device 104. In the case of a false positive, the user has not lost any content and can skip back to view the falsely identified material in minimal time. Skipping back is cumbersome in conventional tape-based systems that use motors to stop, change direction, accelerate, run, decelerate, stop change direction, and resume forward play. Because all the content is recorded and easily played out in the event of a false positive commercial identification, the identification method used may be much more aggressive.

Given that most HDD video recording systems incorporate video and/or audio encoders, the system is burdened by no additional cost, either in memory or computation by incorporating commercial detection. More aggressive settings of commercial skip enable the system to put more programming time on the HDD by deleting the commercial from the storage with a copy operation. The system could run an offline compress task to recopy the program over the commercials and reduce the total disk space consumed. There is a risk of false positives eliminating content in this way, however, only those scenes assigned high or extremely high probability of being a commercial may be eliminated in this way and the system can be tuned to the desired operating point. The disk space savings translates into either higher quality for a given broadcast video record time or a longer record time for a given disk size.

By identifying commercials in the original program, the system could replace the original broadcast commercial with a locally inserted advertisement. By identifying specific commercials in the original program, the system could disregard the commercial skip user input and require that these certain commercials be displayed to the viewer.

Signatures of known commercials (i.e., their statistics) could be stored in a database (e.g., on line) and accessed by a system incorporating a commercial detector. The signature of the incoming video could be developed and correlated with the known commercials for a higher confidence. The system could take various actions based on knowledge of which commercial is detected (e.g., must display, must skip, replace with local add, optionally skip).

While the invention has been particularly shown and described with reference to the preferred embodiments thereof, it will be understood by those skilled in the art that various changes in form and details may be made without departing from the spirit and scope of the invention.

The invention claimed is:

1. A method for preventing a user from automatically advancing an audio/video signal past marked material comprising the steps of:
   (A) detecting possible triggering events during encoding of said audio/video signal;
   (B) generating one or more scores of various levels in response to said triggering events;
   (C) marking a portion of said audio/video signal in response to said one or more scores; and
   (D) preventing said user from advancing past said marked material during playback in response to said one or more scores, wherein a particular one of said scores is used to determine how aggressive said method determines whether said triggering events are detected.

2. The method according to claim 1, wherein step (A) comprises detecting synchronized audio and video statistics from both an audio portion and a video portion of said audio/video signal.

3. The method according to claim 1, wherein said method further comprises the step of:
   adapting one or more thresholds and detection criteria used to generate said one or more scores.

4. The method according to claim 1, further comprising the steps of:
   skipping an undesirable material during said playback in response to one of said scores; and
   inserting alternate material in place of said undesirable material advanced past.

5. The method according to claim 4, wherein said advancing past said undesirable material is selectively enabled and disabled in response to a user input.

6. The method according to claim 1, wherein one of said one or more scores is used to generate a playlist used to determine a particular portion of the marked material to skip.

7. The method according to claim 1, wherein step (A) further comprises recording said audio/video signal in an encoded form.

8. The method according to claim 1, wherein step (A) includes said triggering events occurring at a beginning of said marked material and at an end of said marked material.

9. The method according to claim 1, wherein said marked material comprises advertisements.

10. The method according to claim 1, further comprising the step of:
    replacing said marked material with alternate material.

11. An apparatus comprising:
    a detector circuit configured to generate (i) an audio/video data signal and (ii) one or more score signals of various levels in response to an input signal; and
    a data storage device configured to (i) store said audio/video data signal and said one or more score signals and (ii) generate an output signal in response to (a) said stored audio/video data signal and (b) one of said score signals, wherein (i) said apparatus is configured to prevent a user from skipping a marked portion of said audio/video data signal and (ii) a particular one of said scores is used to determine how aggressive said apparatus determines whether a triggering event has been detected.

12. The apparatus according to claim 11, wherein said apparatus is integrated into an audio/video playback system.

13. The apparatus according to claim 11, wherein said data storage device generates said output signal in further response to a user input.

14. The apparatus according to claim 11, wherein said data storage device comprises a random access storage device.

15. The apparatus according to claim 11, wherein said data storage device comprises a hard disk drive.

16. The apparatus according to claim 11, wherein said data storage device comprises an optical disk drive.

17. The apparatus according to claim 11, wherein said detector circuit comprises an audio processor and a video processor each configured to detect a plurality of triggering events used to generate said scores.

18. The apparatus according to claim 17, wherein said apparatus further comprises an analyzer circuit configured to generate said scores in response to said triggering events.

19. A method for preventing a user from automatically advancing an audio/video signal past marked material comprising the steps of:
    (A) detecting possible triggering events during encoding of said audio/video signal, wherein said detecting comprises detecting synchronized audio and video statistics from both an audio portion and a video portion of said audio/video signal;
    (B) generating one or more scores of various levels in response to said triggering events;
    (C) marking a portion of said audio/video signal in response to said one or more scores; and
    (D) preventing said user from advancing past said marked material during playback in response to said one or more scores.

20. The method according to claim 19, wherein a particular one of said scores is used to determine how aggressive said method determines whether said triggering events are detected.

* * * * *